June 2, 1953
F. P. KLOSKY
2,640,628
COMBINATION COMMERCIAL CONTAINER
AND HOUSEHOLD MEASURING VESSEL
Filed June 21, 1948
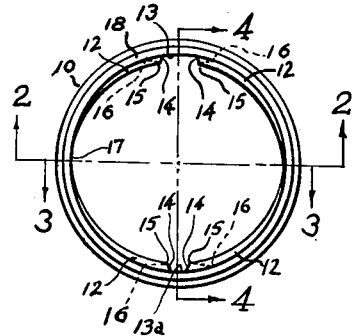
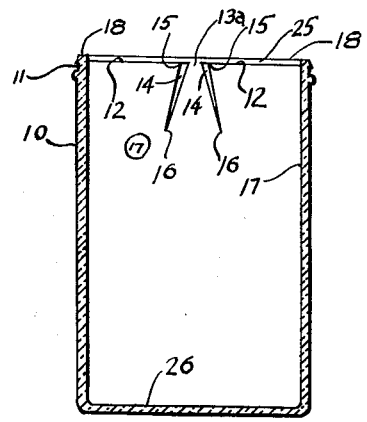
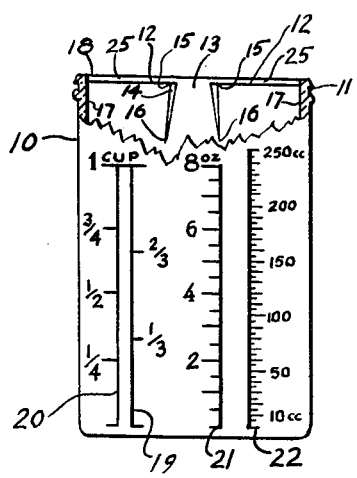
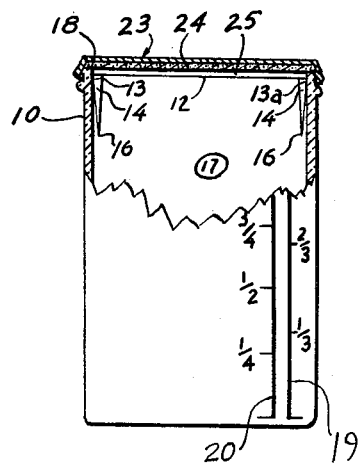
WITNESS
Ruth M. Conklin
INVENTOR
Frank P. Klosky Patented June 2, 1953

2,640,628

UNITED STATES PATENT OFFICE 2,640,628

COMBINATION COMMERCIAL CONTAINER AND HOUSEHOLD MEASURING VESSEL

Frank P. Klosky, Olean, N. Y.

Application June 21, 1948, Serial No. 34,165

2 Claims. (Cl. 222—158)

The present invention relates generally to a graduated commercial container such as a jar or bottle having internal pouring spouts or channels.

An object of this invention is to provide a jar or bottle which has integral internal channels to facilitate the pouring of small quantities of fluid from the jar or bottle into another vessel or container.

Another object is to provide a combined graduated jar or bottle and internal pouring channels in which the channels are shaped and proportioned and so positioned within the container that at least one of the channels is especially adapted for pouring fluids in a narrow stream into another vessel or container having a relatively small mouth or opening.

A further object is to provide a combined graduated container and internal pouring channels in which the channels are so formed as to reduce the amount of undesirable waste drip on the outside of the container during and after a pouring operation.

A more specific object of the present invention is to provide a combined graduated commercial container and pouring channels from which the contents may be poured in measured quantities and which container may be utilized as a measuring vessel for general household and photographic use.

A still further object is to provide a combination graduated measuring vessel and commercial container having integral internal pouring channels or spouts so positioned within the container that the edges of the channels will not damage the padding within a closure or cap for the container when the container is sealed or capped.

Another object is to provide a combination graduated commercial container and internal lips and pouring channels, and from which container the contents may be poured out in small measured quantities, and which graduated container has relatively thin walls and bottom to reduce thermal shock breakage of the container when the container is used as a measuring vessel after its original contents has been poured out or removed.

A further object is to provide a commercial container graduated in cups and fractions thereof, in ounces and fraction of ounces and in cubic centimeters to further enhance its domestic use as a measuring vessel for photography or general household duties after the initial commercial use of the graduated container. Other objects and advantages of the invention will be apparent to those skilled in the art and/or will be pointed out in connection with the accompanying drawing wherein by way of example and not in limitation of the invention, I have illustrated a preferred embodiment of the invention.

In the accompanying drawing:

Figure 1 is a plan view, with the closure removed, of the combination graduated container and integral pouring channels.

Fig. 2 is a side elevation of my invention, the upper portion thereof broken away and shown in section, taken substantially along broken line 2—2 of Fig. 1.

Fig. 3 is a vertical section of the combination graduated container and integral pouring channels taken along broken line 3—3 of Fig. 1.

Fig. 4 is a side elevation partly in section, taken along broken line 4—4 of Fig. 1, showing a closure in section in place on top of the container.

Similar numerals refer to similar parts throughout the several views.

In the drawing 10 designates a graduated container or jar, which may be of any desired shape or size. The container 10 is provided with a relatively large neck portion 11, along the side of which extend integral eccentric off-sets 12 which cooperate in forming channels 13 and 13a within the upper portion of the container. The eccentric off-sets 12 also form internal raised portions or lips which permit the flow of fluids through one of the channels 13 or 13a when pouring small quantities of fluid from the graduated container 10. The internal channel or spout 13a is smaller than channel 13, Fig. 1, to facilitate the pouring of smaller measured quantities of the contents from the graduated container.

The sides 14 of the channels 13 and 13a, Figs. 1, 2, 3, and 4, taper from the eccentric off-sets 12 to points 16 in the internal wall 17 of the graduated container 10. The edges or corners 15 of the channels 13 and 13a lie in the eccentric off-sets 12 which are positioned slightly below the plane of the sealing top 18 of the container 10 to form a space 25 to prevent puncture or damage to padding 24 within the closure 23, Fig. 4, when the closure is pressed or screwed on the top of the graduated container.

Fig. 2 shows a preferred arrangement of graduations which may be changed to conform to the various shapes and sizes of commercial containers. The present combination graduated container and internal pouring channels is graduated in even fractions 20 and odd fractions 19 of a cup measure and also scaled in ounces and fractions thereof 21, and further graduated in cubic centimeters 22.

The combination graduated container and internal pouring spouts 13 and 13a has a relatively large neck portion 11 to enhance its utility as a general household and photographic measuring vessel. The graduated commercial container is especially adapted to measure fluids, liquids, powders, granules and pastes when used in household duties and photography after its initial utility of dispensing, in measured quantities, its original contents.

The graduated container 10 has relatively thin walls 17 and bottom 26, Fig. 3, to reduce thermal shock breakage when the container is used as a measuring vessel to measure hot liquids in general household duties or in photography.

I do not limit my invention to the exact forms shown in the drawings, for obviously changes may be made within the scope of the claims.

I claim:

1. In a receptacle of the class described, a combination graduated commercial container and household measuring vessel having a relatively large neck portion terminating in an open top, said neck portion being provided on its interior surface with a plurality of offsets, in pairs, each pair of offsets consisting of two ridges, converging toward said open top, and forming between them a channel for guiding the contents of the container outward when the container is in a pouring position, said ridges terminating sufficiently below said open top to provide a space between the said open top and said ridge termini; each pair of offsets including two ledges lying in a plane parallel to the plane of said open top, and disposed one on each side of said channel, each ledge being connected to its respective ridge terminus and extending away from said channel.

2. The device as recited in claim 1 in which said ledges diminish in width in a direction away from said termini.

FRANK P. KLOSKY.

References Cited in the file of this patent

UNITED STATES PATENTS

| Number | Name | Date |
|---|---|---|
| 272,713 | Leake | Feb. 20, 1883 |
| 1,261,072 | Byehara | Apr. 2, 1918 |
| 1,328,184 | Moore | Jan. 30, 1920 |
| 1,710,951 | Shaweker | Apr. 30, 1929 |
| 1,718,897 | Dunbar et al. | June 25, 1929 |
| 2,368,065 | Hyatt | Jan. 23, 1945 |
| 2,445,101 | Bailey | July 13, 1948 |